May 12, 1970 G. MATHUS ET AL 3,511,449

TAPE CARTRIDGE WITH SPEED CHANGER

Filed Aug. 7, 1968 2 Sheets-Sheet 1

INVENTOR.
GREGORY MATHUS
ALAN B. LOWRY
BY Wolf, Greenfield & Hieken
ATTORNEYS

TAPE CARTRIDGE WITH SPEED CHANGER

Filed Aug. 7, 1968

2 Sheets-Sheet 2

INVENTOR.
GREGORY MATHUS
ALAN B. LOWRY

BY Wolf, Greenfield & Hieken

ATTORNEYS

United States Patent Office 3,511,449

Patented May 12, 1970

3,511,449

TAPE CARTRIDGE WITH SPEED CHANGER

Gregory Mathus, Cambridge, and Alan B. Lowry, Canton, Mass., assignors to Data Packaging Corporation, Cambridge, Mass., a corporation of Massachusetts

Filed Aug. 7, 1968, Ser. No. 750,806
Int. Cl. B65h *17/48*
U.S. Cl. 242—55.19 8 Claims

ABSTRACT OF THE DISCLOSURE

An endless tape cartridge is provided with tape feeding pinch rollers connected for rotation, when used with a record playback machine, to the driving capstan through speed reducing means to feed the tape at a slower rate than would normally be determined by direct engagement of the tape with the capstan. In one form, one of the pinch rollers is gear connected to a parallel friction wheel which engages and is driven by the capstan. In another form, one of the pinch rollers is coaxially connected to a larger friction wheel which is in driving engagement with the capstan. The pinch roller and larger friction wheel can be yieldably supported at each end on the end of an elongated portion fashioned by a long U-shaped slot cut in the top and bottom walls.

This invention relates to magnetic tape cartridges and more particularly comprises a new and improved cartridge for endless tapes.

At the present time four and eight track endless tape cartridges are very widely used in a variety of settings particularly for musical recordings. Although advanced at relatively slow speeds, the tapes are nevertheless capable of musical reproduction of a very high quality. The cartridges, however, are somewhat limited in capacity as the reels are relatively small, and while the capacity can be increased by reducing tape speed, this is accompanied by a corresponding reduction in the quality of the recording. In certain applications recording fidelity is not important and in such situations effective cartridge capacity may be increased by reducing the tape speed. However, the players now on the market all drive the cartridges so as to move the tape at 1⅞ i.p.s.

One important object of this invention is to provide an endless tape cartridge capable of being driven at standard speed and which internally reduces the tape speed so as to increase the storage capacity of the cartridge.

Another important object of this invention is to provide a magnetic tape cartridge construction which will entail only minimum tooling changes of the regular tooling to mass produce the modified cartridge.

To accomplish these and other objects, my invention includes among its features a cartridge of standard dimensions and which may be used in any standard machine. Incorporated into the cartridge is a speed reduction device which may be driven directly from an externally powered drive means of standard design and which drives the tape inside the cartridge at a speed which is a fraction of the speed of the drive means.

In standard tape cartridges, the tape is ordinarily engaged by an externally powered drive wheel directly, which wheel moves the tape in the cartridge at the tangential velocity of that wheel. In accordance with this invention, the tape speed is some selected fraction of that velocity.

These and other objects and features of this invention along with its incident advantages will be better understood and appreciated from the following detailed description of two embodiments thereof, selected for purposes of illustration and shown in the accompanying drawing in which.

Figure 1:
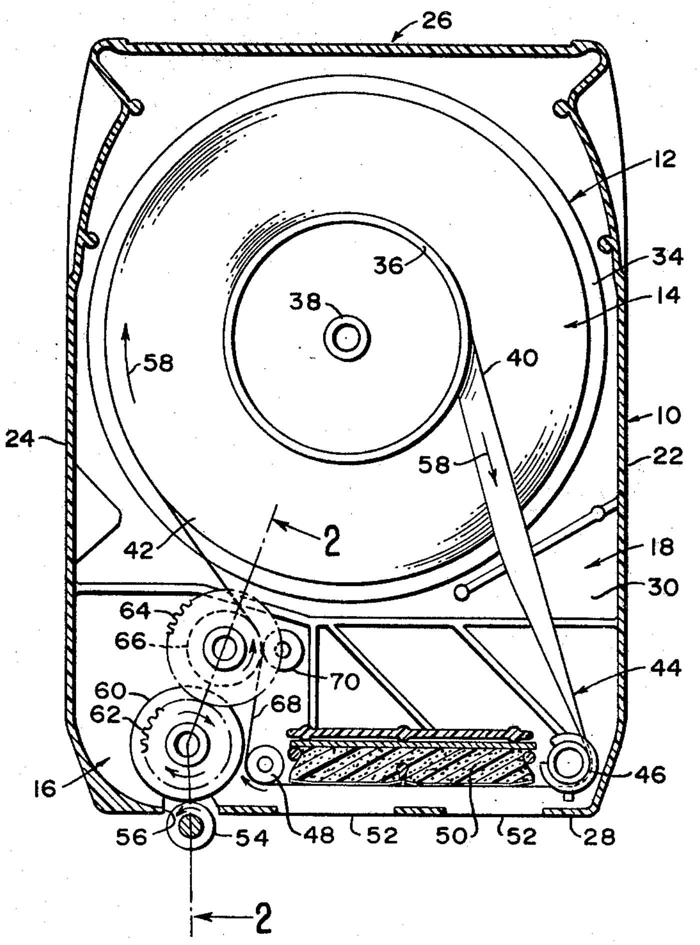
FIG. 1 is a plan view of a cartridge with its cover removed and constructed in accordance with this invention.
Figure 2:
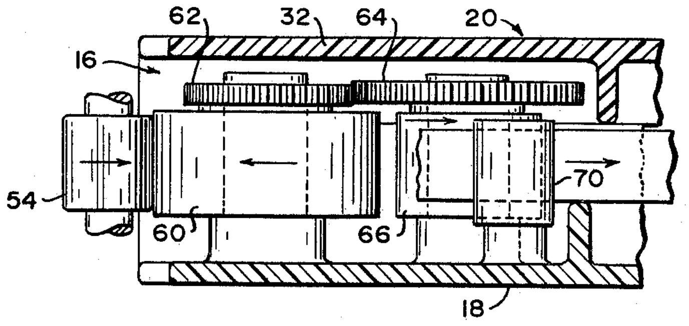
FIG. 2 is a cross sectional view taken along the section line 2—2 of FIG. 1.

The magnetic tape cartridge shown in FIGS. 1 and 2 includes a cartridge case 10, endless tape reel 12, magnetic tape 14 and tape drive and speed reduction assembly 16. These various components of the cartridge are described in detail below.

The case 10 is of generally standard shape and size and includes a bottom tray 18 and a cover 20 that together form a closed chamber for the endless tape 14. The tray 18 and cover 20 together define the side walls 22 and 24, rear wall 26 and front wall 28 of the cartridge In addition, the tray 18 defines bottom wall 30 while the cover 20 defines top wall 32.

The reel 12 may be of any one of a number of different configurations, and the form shown includes a bottom flange 34 and a hub 36 which rotate together about reel spindle 38. As in all conventional endless tape cartridges, the tape 14 wound on the reel 12 is drawn from the reel at the hub 36; that is, the inner convolution of tape is peeled from the reel as suggested at 40, and the tape is returned to the reel at the outer convolution as suggested at 42. The length of tape free of the reel between the inner and outer convolutions is termed the loop and is identified by reference character 44. The loop 44 is guided along the front wall 28 of the cartridge by a pair of guide posts 46 and 48, and the tape between the posts 46 and 48 is supported by a cushion 50. A pair of windows 52 in the front wall 28 of the cartridge provide access to the interior of the case so that a playback and/or recording head may engage the tape loop between the two posts at the region where the tape is supported by the cushion 50.

The cartridge shown in FIGS. 1 and 2 is of the eight track variety, which is distinguished by the fact that the drive is imparted to the tape by a drive wheel 54 which forms part of the playback or recording machine and is located exterior of the cartridge. The drive wheel 54, sometimes termed the capstan, is fixed in the machine, and opening 56 in the front wall 28 enables the capstan to engage a driven wheel inside the cartridge, that forms part of the assembly 16 so as to move the tape in the direction suggested by the arrows 58. In conventional eight track cartridges, the loop is engaged directly by the capstan 54 and is squeezed between it and a driven roller in the position of wheel 60 of the present invention.

In accordance with the present invention, the capstan 54 of the machine engages the wheel 60. In FIG. 2 it will be noted that the driven wheel 60 in turn imparts rotation to the circular gear 62 which is coaxial with and rigidly secured to the driven wheel. The gear 62 in turn engages the periphery of larger circular gear 64 disposed adjacent to it, and the circular gear 64 is coaxial with and rigidly secured to the friction wheel 66. As is evident in FIGS. 1 and 2, the leg 68 of the tape loop 44 between the post 48 and the outer convolution of tape on the reel is squeezed between the friction wheel 66 and a pinch roller 70 so that rotation of the gear 64 is imparted to the tape as a translational motion.

The pinch roller 70 and/or the friction wheel 66 may preferably be coated with a rubber like material which enables the wheel 66 to be pressed firmly against the pinch roller 70 and firmly contact the tape. It is apparent that firm contact of the tape is required to insure that the tape advances at the tangential speed of the roller 66. Obviously any slipping between the roller 66 and the tape will result in a slower tape speed.

From the foregoing description it is apparent that any desired speed reduction may be achieved by a selected combination of gear and wheel diameters. Thus, with the general relationships shown, the speed advance of the tape loop may be substantially 50% of the tangential velocity of the capstan 54. However, a substantially greater speed reduction may be achieved by increasing the diameter of gear 64 and/or decreasing the diameter of gear 62. Similarly, a reduction may be achieved by increasing the diameter of the wheel 60. It will be apparent that these various selections may be determined by mathematical analysis, and no invention is involved in modifying wheel sizes to achieve the particular reduction in speed intended.

Figure 3:
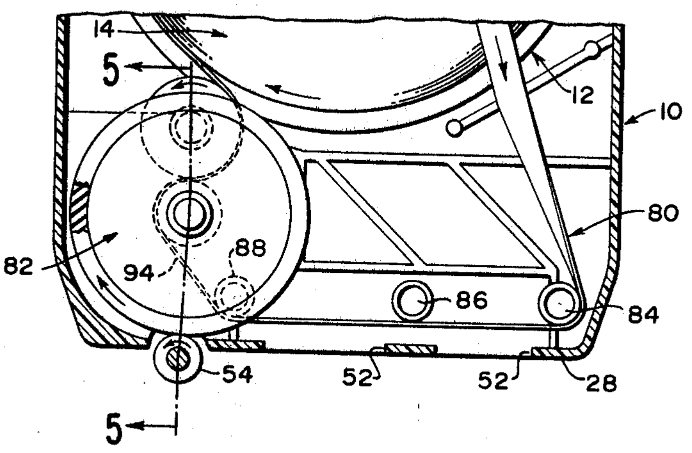
FIG. 3 is a fragmentary cross sectional view of another embodiment of magnetic tape cartridge with its cover removed and constructed in accordance with this invention.
Figure 4:
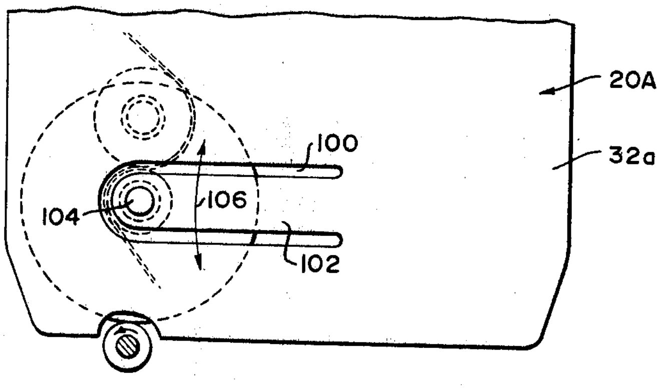
FIG. 4 is a fragmentary plan view of the cartridge cover of the embodiment shown in FIG. 3.
Figure 5:
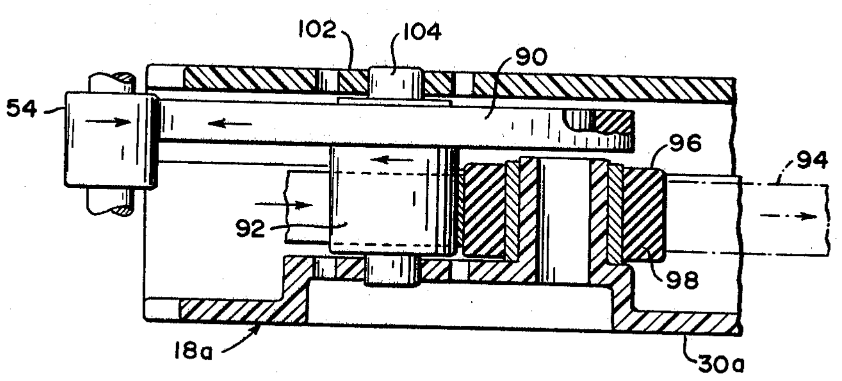
FIG. 5 is a fragmentary cross sectional view taken along the section line 5—5 in FIG. 3.

The embodiment of FIGS. 3–5 varies from the embodiment of FIGS. 1 and 2 basically in the arrangement of the drive and speed reduction assembly. Thus, the cartridge case 10 may be identical to the case in the first described embodiment, and the reel 12 and tape 14 may be identical as well. However, the configuration of the tape loop 80 is somewhat different because of the configuration of the drive and speed reduction assembly 82. Just as the first embodiment, the second embodiment is also shown incorporated into an eight track cartridge wherein an external capstan 54 is used to activate the drive and speed reduction assembly 82. As is explained in more detail below, this invention, however, is not at all limited to use in this variety of cartridge, but rather is suitable for incorporation into a four track cartridge as well wherein the drive capstan forming part of the machine is literally pivoted into and lies wholly within the cartridge when the cartridge is mounted in place on the machine.

In FIG. 3 it will be noted that three guideposts, 84, 86 and 88 are disposed adjacent the front wall 28 of the case to guide the loop 80 across the openings 52. The center post 86 functions primarily as a substitute for the cushion 50 of the first embodiment, and it is to be understood that the two are interchangeable. In no sense is this invention limited to the specific arrangement of posts or cushions used to guide or support the tape across the openings in the front wall of the cartridge.

The sapstan 54 is shown in FIG. 5 to engage the periphery of the driver wheel 90, which is coaxial with and fixed for rotation with the friction wheel 92. The diameter of the wheel 92 is smaller than that of the wheel 90, and therefore it is evident that the tangential velocity of the wheel 92 is but a fraction of the tangential velocity of the wheels 90 and 54.

The return leg 94 of the tape loop 80 is shown to be pinched between the friction wheel 92 and the pinch roller 96, which has a rubber-like outer layer 98. Consequently, the leg 94 of tape may be squeezed between the friction wheel 92 and the pinch roller so as to insure proper engagement of the leg and proper advancement of the tape at the speed determined by the tangential velocity of the friction wheel 92.

In FIG. 4 the cover **20*a* of the case 10 is shown to have a U-shaped slot 100 formed in the top wall 32*a* so as to form a spring like support 102 for the shaft 104 of the driven wheel 90 and friction wheel 92. The spring like support 102 allows the shaft to displace laterally in the direction of arrow 106. A similar slot is also formed in the bottom wall 30*a* of tray 18*a* where the lower end of the shaft 104 is supported, as shown in FIG. 5. The flexibility introduced into the friction wheel support allows the pressure exerted on the periphery of wheel 90 by the capstan 54 to be applied by the friction wheel 92 against the pinch roller 96 to insure proper pressure on the leg 94 of the tape so that the tape advances at the precise speed desired. It will be appreciated that regardless of the speed at which the tape is driven, the tape must be driven at uniform speed to avoid "wow," and any slippage between the tape leg 94 and the periphery of wheel 92** will cause significant distortion of the recorded material on the tape. Even a slight change of speed will readily be detected by the listener and constitute a significant annoyance.

From the foregoing description it will be appreciated that each of the embodiments of this invention will achieve the objects set forth in the introduction. Thus, each of the cartridges shown may be inserted in a standard player, and the tape in the cartridge will turn at a constant speed which is some selected fraction of the tangential velocity of the capstan of the machine. Accordingly, the capacity of the tape on the reel is significantly enhanced so that the cartridge is suitable for recording much longer works than would otherwise be possible. Because some sacrifice in fidelity is required to achieve this increased capacity, it is contemplated that a cartridge constructed in accordance with this invention will be particularly suitable for recording the spoken word. Typically, the cartridge is suitable to record material now disseminated only in magazines and newspapers. For example, a significant quantity if not all of certain national weekly publications could be distributed in recorded form in a cartridge of the type described.

As indicated, while the embodiments of this invention shown are of the eight track variety, the invention may be used in four track tape cartridges as well. In such tape cartridges, an opening is provided in the bottom wall of the cartridge, and the capstan or drive wheel of the machine pivots upwardly through that opening in the bottom wall and engages the tape against a pinch roller fixed in the cartridge. In accordance with this invention the capstan indirectly drives the friction wheel of the cartridge to impart a different tangential speed to it in the manner of the capstan 54 in the drawings presented.

Because numerous modifications may be made of this invention without departing from its spirit, it is not intended to limit the breadth of this invention to the embodiments illustrated and described. Rather, it is intended that the scope of this invention be determined by the appended claims and their equivalents.

What is claimed is:

1. A magnetic tape cartridge for endless tape comprising

- a case designed to fit within the space provided in a machine for receiving such cartridges,
- a reel and an endless tape wound upon it and with a tape loop adapted to be engaged by the head of a playback and/or recording machine,
- a friction wheel in the cartridge engaging the loop for imparting its tangential velocity to the tape,
- and speed reduction means within the cartridge and an operatively connected to the friction wheel and adapted to engage the capstan of a machine on which the cartridge is used for converting the tangential velocity of the capstan to some different tangential velocity for the friction wheel.

2. A magnetic tape cartridge as described in claim 1 further characterized by

- said speed reduction means including a wheel within the case disposed at the front of the case and positioned to be engaged directly by the capstan to turn at the same tangential velocity at the capstan,
- and means connecting the wheel to the friction wheel so that they rotate at a preselected related velocity.

3. A magnetic tape cartridge as described in claim 2 further characterized by said wheel being coaxial with and rotatable at the same angular velocity as the friction wheel.

4. A magnetic tape cartridge as described in claim 2 further characterized by a pinch roller disposed adjacent the friction wheel and the tape loop being pressed between them.

5. A magnetic tape cartridge as described in claim 4 further characterized by said wheel being coaxial with and rotatable at the same angular velocity as the friction wheel.

6. A magnetic tape cartridge as described in claim 5 further characterized by a yieldable support for the wheel and friction wheel enabling the friction wheel to be displaced toward the pinch roller, and means causing the force exerted by the capstan on the wheel to be exerted against the pinch roller by the friction wheel.

7. A magnetic tape cartridge as described in claim 5 further characterized by means causing friction wheel to press against the pinch roller when the capstan presses against the wheel.

8. A magnetic tape cartridge as described in claim 7 further characterized by a spring support for the wheel and friction wheel causing them to displace in the direction of the pinch roller when engaged by the capstan.

References Cited

UNITED STATES PATENTS

| | | | |
|---|---|---|---|
| 3,149,207 | 9/1964 | Maxev | 179—100.2 |
| 3,191,834 | 6/1965 | Nakauchi | 226—181 XR |
| 3,219,246 | 11/1965 | Kihara | 226—181 |

FOREIGN PATENTS

| | | |
|---|---|---|
| 756,547 | 9/1956 | Great Britain. |

BILLY S. TAYLOR, Primary Examiner

U.S. Cl. X.R.

226—181, 190